Feb. 5, 1963  H. E. JACKSON ETAL  3,076,555
FLUID FILTERS
Filed June 29, 1959  2 Sheets-Sheet 1

INVENTORS
Harold Ernest Jackson
Peter William Tripp
BY Ronald Edward Fairfield
Edw. R. Walton
ATTORNEY Feb. 5, 1963 H. E. JACKSON ETAL 3,076,555
FLUID FILTERS
Filed June 29, 1959 2 Sheets-Sheet 2
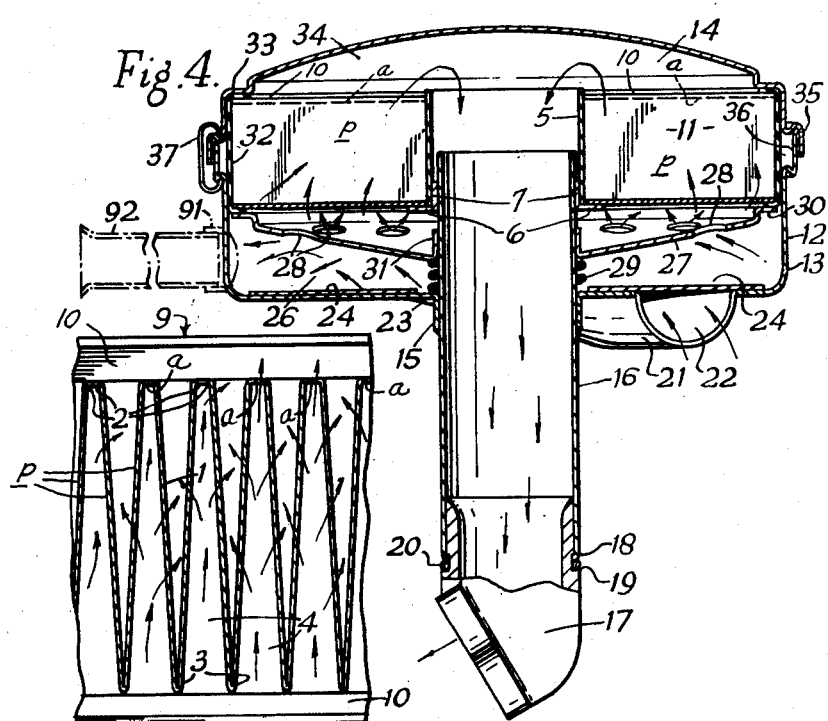
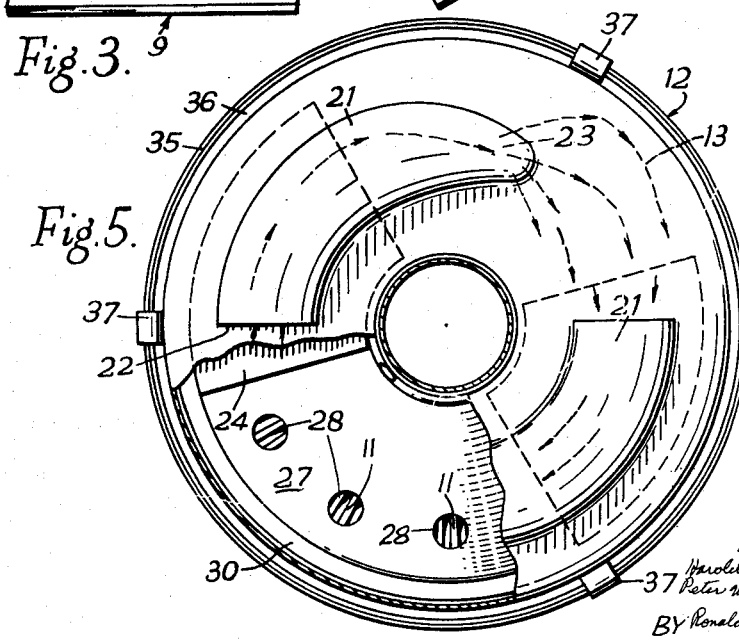
INVENTORS
Harold Ernest Jackson
Peter William Tripp
BY Ronald Edward Tanfield
Edw. R. Walton
ATTORNEY

3,076,555
FLUID FILTERS

Harold Ernest Jackson, Plympton St. Maurice, Devon, Peter William Stripp, Milehouse, Plymouth, Devon, and Ronald Edward Farnfield, Efford, Plymouth, Devon, England, assignors to Tecalemit Limited, Plymouth, Devon, England
Filed June 29, 1959, Ser. No. 823,662
Claims priority, application Great Britain June 30, 1958
9 Claims. (Cl. 210—493)

This invention relates to fluid filters and is more particularly concerned with the construction of filter elements of the type in which a pleated filtration material is used, although certain of its features are applicable to filters which make use of filter elements of other kinds.

The invention is particularly applicable to, and will be more fully described as applied to, air filters or cleaners for internal combustion engines, although it is also applicable to filters for other purposes, including filters for both gases and liquids of various kinds. It could, for example, be applied to filters for lubricating oil.

Modern designs of internal combustion engines, particularly those used on motor vehicles, require the provision of an air cleaner which is of low height, while still providing a substantial area of filtration material which is exposed to the inflow of air. The same requirement is also encountered in the design of filters for other purposes and for other fluids.

The present invention, in one of its aspects, is accordingly concerned with the provision of an improved form of filter element which can be so constructed as to meet the above mentioned requirement, while having a number of practical advantages over known forms of construction and methods of constructing filter elements.

According to the invention, therefore, in one of its aspects, a filter element is provided comprising a strip or strips of filter material in sheet form which is pleated about fold lines running transversely across the width of the strip and which is formed into an annulus with the pleats radiating from the axis of the annulus, the inner circumference of the annulus having a tubular core fitted therein against the inner edges of the pleated material, and the outer circumference of the annulus having an outer sleeve or band of a resilient, elastomeric material therearound and designed to grip the outer edges of the pleated material resiliently and to press against said outer edges of the pleated material radially inward and force their inner end edges against the inner tube or core. This constitutes an important feature of the present invention.

The outer sleeve or band referred to above is preferably given a width which is greater than the axial thickness of the filter element, so that the band projects above and below the upper and lower edges of the pleated filter material, or at least beyond one of the said edges. In this way, the outer band serves not only to provide a fluid seal for the edges of the pleated filter material at the outer ends of the pleats while maintaining the circular form or shape of the filter element, but also, when the filter element is arranged in a suitable filter casing or housing and is pressed against a part of the latter, such as its cover or bottom for example, it prevents leakage of the fluid past the element. The projecting edge of the outer band, which does this, may also assist in providing additional space between the upper or lower folds of the pleated filtration material and the cover or bottom of the casing for the flow of air or other fluid which is being filtered from or to the filter element.

Another feature of the invention is to provide such a pleated filter element wherein the converging surfaces of the pleats, which are exposed between their points of juncture to the incoming fluid stream (to be filtered), are folded in a manner so as to be spaced apart at the juncture of their convergence for a distance to permit contaminants in or entrained with the fluid—that may be deposited thereon at said junctures—to be more readily detached therefrom, under the influence of gravity and assisted by the vibrations of the engines, rather than to build-up progressively therebetween.

The filter element which has been described thus far, when used in an air cleaner for an internal combustion engine, is intended to be fitted in a casing of such form that the air is drawn into the casing below the filter element, and is drawn upwardly through the pleated filtration material.

Further features of the invention will become apparent from the following description of a number of embodiments thereof. Reference will be made to the accompanying drawings, in which:

FIG. 3 is a detail enlarged developed sectional view, taken on the line III—III in FIG. 1;

FIG. 4 is a sectional view showing a filter including a filter element of the general kind shown in FIGS. 1 to 3, which element is fitted in a filter casing; and FIG. 5 is an underneath plan view of the filter shown in FIG. 4.

Figure 1:
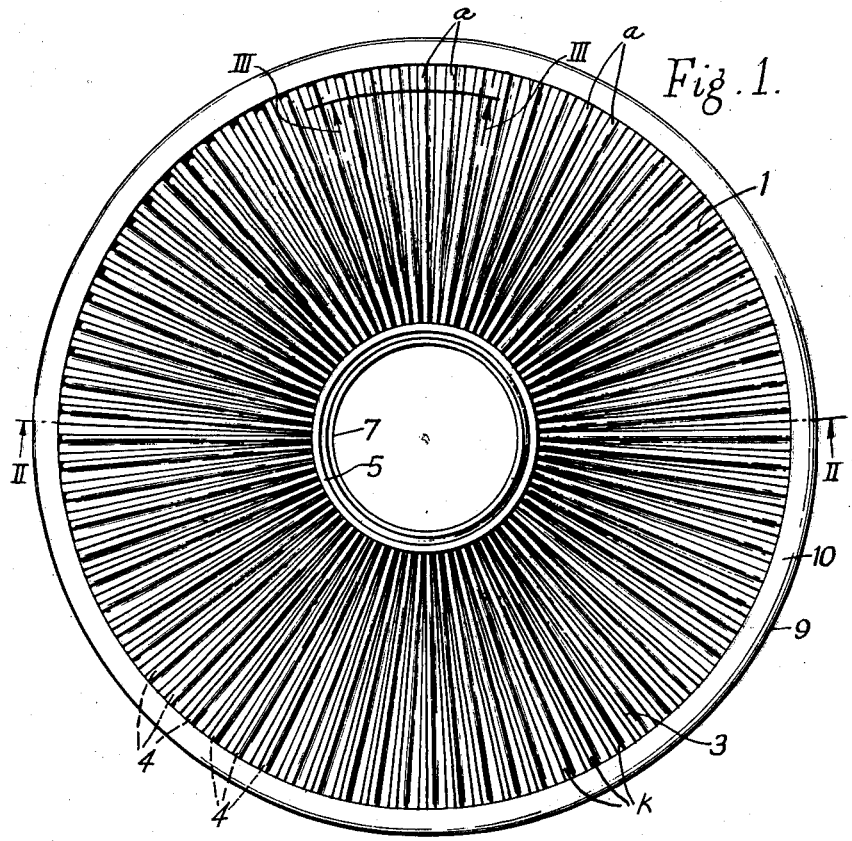
FIG. 1 is a plan view showing a preferred form of filter element exemplifying the invention.
Figure 2:
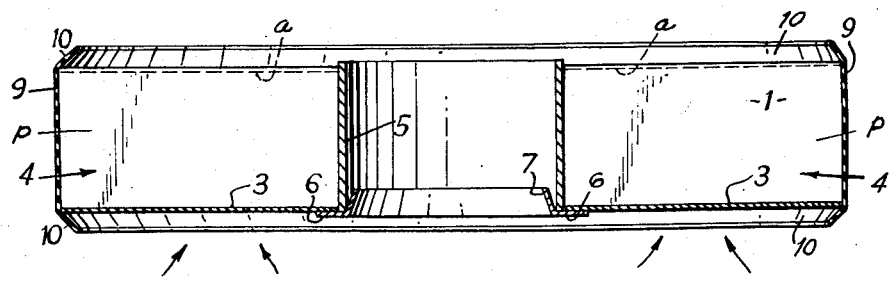
FIG. 2 is the section taken on the line II—II in FIG. 1.

Referring first to FIGS. 1 to 3, the filter element shown, which is intended for use in the air filter of a motor car or other internal combustion engine, is formed of a length or strip of a suitable filtration material 1. For this it is preferred to use a porous paper, which may be treated with a synthetic plastic or other suitable substance in order to improve its strength and filtering efficiency, although other filtering materials in sheet form may also be used. The strip of material 1 is formed with transverse pleats p, the fold lines of which extend across the strip at right-angles to the length thereof. The pleating may be done by passing the strip under a suitable fluted forming roller or through a pair of or a series of such rollers, which form the required folds.

Heretofore, in conventional pleated filters, whether of the pleated cylindrical (or "star") type or of the box type in which a number of layers of pleated material are fitted one above the other, it has been usual for the pleats to be formed by single sharp folds. The effect of these is to produce acute angled spaces on the inlet side of the filter material, in which spaces the solid substances or contaminants in the fluid being filtered tend to collect and to be retained, since the narrowness of these spaces near the fold lines tends to prevent the contaminants from becoming detached from the filter material, for example under the action of vibration and gravity. This results in a progressive reduction in the effective filter area.

One of the features of the present invention is to provide means for preventing or reducing the formation of such acute-angled spaces in the folds of the filter material, in which the contaminant tends to be trapped and held.

According, therefore, to this feature of the invention, the filtration material, instead of being pleated about single sharp fold lines with the production of spaces of acute-angled V section in which the material on opposite sides of the V meets in the region of the angle on the inlet side of the filter element, is provided with pleats p each of which (at least in the case of the folds nearer the discharge side of the filter element) is formed either by folding the material along a pair of folded lines spaced from each other, which is preferred, or by bending the material along a rounded or arcuate fold. In each case, the result is that a clearance is left between the material on opposite sides of each space on the inlet side of the filter element throughout the full depth of the pleats and along at least the greater part of the length of the latter. In this way, the production, on the inlet side of the element, of narrow acute-angled space in which the sides of the pleat meet is avoided, or at least reduced, thus greatly reducing the tendency of the contaminant to be trapped inside these spaces.

Thus, referring to FIG. 3, each pleat is produced by forming upper folds 2 along lines which are spaced from each other, at least for the greater part of the length of the pleats to provide a relatively wide connecting wall $a$ between the adjacent pleat portions connected by it, which portions diverge downwardly from said wall at obtuse angles thereto. These fold lines, which may in fact be parallel to each other, are spaced from each other preferably for the full distance between the ends of the pleats. The lower folds, i.e. those which point towards the inlet side of the filter element, are however sharply folded along single fold lines, as is indicated at 3 in FIG. 3.

This folding or pleating may be accomplished by having one forming-roller formed with obtuse-angled indentations and with acute-angled projections, while the other is formed with suitably spaced acute-angled indentations and obtuse-angled projections which intermesh with the projections and indentations of the first roller. Where only a single fluted roller is used, resilient or other means, such as a roller made of a resilient material, may be provided for pressing the material into the indentations.

The strip of material 1, after pleating, is assembled into the form of a pleated cylinder and the meeting ends of the strip are clipped or otherwise secured together, for example with the use of an adhesive. This cylinder is then spread fan-wise so as to form an annular disc. This may be done using a flat horizontal surface, so that the lines of the pleats radiate from the central vertical axis of the annulus, with which they form angles of 90°.

As is shown in FIGS. 1 and 3, the spaces 4 between the pleated material, i.e. particularly those open at the lower or inlet side of the filter element, have an appreciable width, and this may extend to, or at least almost to, the inner ends at the center portion of the latter.

In order to close the inner ends of the spaces 4 between the pleats $p$, an inner central tube 5 is fitted inside the pleated annulus, so as to form an air seal with the inner edge of the material 1. This inner tube 5 may be made of a porous or non-porous material. This material may be imperforate or it might be perforated in order to facilitate the application of an adhesive used for securing it to the inner edges of the material 1 (see FIGS. 1 and 2). Any suitable adhesive may be employed and it may be applied to the outer surface of the tube 5 before the latter is fitted into the pleated annulus. Alternatively it could be applied to the edge of the material 1.

For the tube 5 it is preferred to use paper, which may be the same as the material 1, or use may be made of a stiffer or more rigid material, such as card, a metal or a synthetic plastic in sheet form.

One preferred method of securing the tube 5 in the pleated annulus involves the use of a layer of a substance which is applied to the tube 5 in solid form and which, after the tube has been fitted in the annulus, is caused first to soften and then to harden again so as to bond the tube 5 to the material 1. This may be done by the use of heat and/or by chemical means. Among the substances which may be used are uncured or partly cured natural or synthetic elastomeric materials, such as synthetic rubber, which is preferred. An example of the latter is the synthetic rubber which is known as "neoprene" and which has the advantage of being resistant to the action of oil.

Alternatively, a partially polymerised synthetic plastic may be used, of the kind which, when heated, first softens and then hardens again owing to the effect of further polymerisation.

The layer of this substance may be applied to the tube 5 in liquid form and allowed to dry on the latter before the tube is fitted into the annulus, or the substance may be formed into a tube or sleeve which is fitted over the tube 5 before the insertion of the latter into the annulus. This latter method is preferred.

Instead of using a central tube 5, the inner ends of the spaces 4 between the pleats could be closed by using a suitable cement or luting. This would be applied to the material 1 and caused or allowed to harden after the pleated annulus has been formed.

In order to provide improved sealing and a more secure attachment between the pleated filter material 1 and the inner tube 5, it is preferred to fit a resilient sealing or gasket ring 6 at one end of the tube 5 and which has an outer body part 8 extending under and may be secured to the material 1 and to the tube 5 by means of the same adhesive as that which bonds the tube 5 to the material 1.

In the construction shown in FIGS. 1 and 2, the ring 6 has an annular inner flange part 7 which projects and preferably angularly into the tube 5 and is not bonded to the latter, at its outer circumferential portion, to provide a resilient sealing engagement with a central tube 16 forming part of the filter casing, see FIG. 4.

According to another arrangement, instead of using a separate flanged ring 6, one or both ends of the inner tube 5, if the latter is made of a suitable material, may be extended laterally outward to lap with the ends of the pleats $p$, to which they are bonded by suitable means.

Alternatively, the tube 5 and the outer circumferential portion of the ring 6 may be formed together as an integral moulding, using a synthetic plastic.

The outer ends of the spaces 4 between the pleats $p$ of the filter element are closed in a manner which is the important feature of the present invention, namely, by an outer band 9 in the form of a sleeve or ring which is made of an elastic or elastomeric material, such as natural or synthetic rubber, the latter being preferred. This band is preferably formed so that its natural or normal circumference is less than the outer circumference of the annulus and is snapped into place, as shown, which causes it to press on and to grip the ends of the pleats. Also the width of the band 9 is made greater than the thickness of the annulus, for the reasons which will appear presently.

To apply the band, it is stretched so that it can be fitted round the pleated annulus, after which it is released so that it can contract on to and grip the latter. This is preferably done after the tube 5 has been fitted in the annulus and before the substance used for bonding the tube to the edges of the material 1 has hardened, so that the pressure of the band 9 tends to press the edges of the material 1 into contact with the tube 5.

Owing to the fact that the material of the band 9 is made wider than the thickness of the pleated annulus, the edges 10 of the band project above and below the annulus. These projecting edges, or one at least of them, is or are of value in providing a seal against the passage of fluid round the filter element when the latter is fitted in its casing, as will be described.

Although it is possible to rely solely on the resiliency of the band 9 to hold it in position on the annulus, it is preferred to cause it to adhere to the latter. This may be done either by using a separate adhesive or by a suitable selection and treatment of the material of the band itself. Thus, the said band may be formed of an uncured or only partially cured elastomeric material, for which it is preferred to use a synthetic rubber, such as that known as "neoprene." After such a band 9 is fitted round the annulus, it is then subjected to suitable heat treatment so as to cause at least that part of the band which engages the outer edges of the material 1 to soften so that it adheres and becomes bonded to the latter. In some instances, a mould or other means may be employed for pressing the band 9 against the edges of the material 1.

During this latter treatment, it is preferred that the projecting edges 10 of the band 9 should either not be softened and then finally cured or, if they are softened, that this should be done while they are clear of the material 1 so that they do not become bonded to the latter.

Instead of using a natural or synthetic rubber for the band 9, this may be made of some other substance which can be softened and then caused or allowed to harden again after the band has been fitted to the annulus. Among such substances are thermo-plastic synthetic compounds or compositions and also thermo-setting substances or compositions. These are generally in an incompletely polymerised state when the band 9 is applied to the annulus, but their polymerisation is then caused or allowed to continue, generally by the use of heat.

Referring now to FIGS. 4 and 5, these show an air filter which is suitable for a motor car engine and which includes a filter element similar to the one which has been described. This element is here indicated generally by the reference 11 and it is fitted in a casing which is indicated generally at 12.

This casing 12 comprises a body part or bowl 13 which is provided with a removable cover 14. The bottom of the bowl 13 is formed with a central opening which is surrounded by an integrally formed flange 15. In this opening there is fitted and secured, by welding or other means, a central tube 16, the upper end of which extends into the interior of the bowl. The lower end of this tube 16 is fitted on a connecting member 17 which is designed for fitting to the air inlet of the engine, where it is secured by suitable means.

The end of the tube 16 fits over the upper end of the member 17 and it is held in position on the latter by the resilient engagement of a lip 18, formed on the tube 16, in a groove 19 which is formed in the member 17. A rubber ring 20 fitted in the groove 19 provides a seal against the entry of air.

In the operation of the filter, air is drawn into the chamber 26 through the inlet channels 21, the shape of which give it a swirling motion. It is then drawn through the holes 28 in the plate 27 and through the filter element 11 into the space 34, whence it passes down through the tube 16 to the air inlet of the engine. Dust or other contaminant which is dislodged and falls from the filter element on to the plate 27 is shaken down the sloping surface of the latter towards the central flange 31, where it collects well clear of the main stream of air reaching the element 11 through the holes 28.

Another feature of the pleated filter element of this invention, is the forming of the pleats in such a way as to minimise the formation of narrow spaces in them in which solid contaminant tends to collect.

Although in the filter casing which has been described, the filtered air leaves the filter through the centre of the filter element and through a central tube provided in the casing, this is not essential. The filtered fluid could be discharged from the filter upwardly, for example through an outlet or outlets provided in the cover.

It may be remarked here that two or more of the filter elements which have been described could be used in a single filter, in which they could be arranged in series, in order to obtain thorough filtration, or, which would usually be the case, in parallel, so that part of the fluid being filtered would pass through one element and part through another. By the term "cured" or "curing," as used in the following claims, is meant either cured or curing, vulcanized or vulcanization, or polymerized or polymerization according to the material employed.

That which is claimed, as new and to be secured by Letters Patent, is:

1. A method of forming a filter element for filtering fluids, which comprises pleating a strip of filtration material in sheet form about fold lines transverse to the length of the strip; forming said material into an annulus with the pleats extending longitudinally on radii from the central axis of the annulus; applying a bonding substance externally to a tube to form a solid but partially uncured layer thereon; fitting said tube within said annulus to close the spaces between the pleats at the inner ends thereof; applying a resilient band of elastomeric material to the outer circumference of said annulus so as to surround the latter under tension and close the spaces thereat between said pleats; thereafter causing the said substance to soften to allow the outer band to force the inner edges of said pleats in said substance on the tube; and then allowing said substance to harden bonding the inner edges to said tube.

2. In the construction of a filter element, a method comprising the steps of pleating a strip of filtering sheet material with the fold lines of the sheet extending in the same general direction and forming said pleated sheet into an annulus with the pleats radiating longitudinally from the axis thereof; then applying an elasticized band of an elastomeric material to the outer circumference of the annulus so as to surround the outer ends of the pleats under its own tension and close the spaces between the pleats; thereafter softening said band to allow the band to impale itself onto the outer end edges of the pleats under its own tension, then causing said band to harden or cure, whereby the end edges of the pleats become embedded on the material of the band.

3. In the construction of a filter element, the method comprising the steps of pleating a strip of filtering sheet-material with the fold-lines of the pleats extending in the same general direction, then forming said pleated sheet into an annulus with the pleats radiating longitudinally from the axis thereof; fittedly inserting a tubular core, having an outer surface to which the inner end of the pleats will adhere, within the inner circumference of said annulus; applying an elasticized band to the outer circumference of said annulus to surround the outer ends of said pleats and close the spaces therebetween and to press the inner edges of said pleats into contact with the outer surface of said core.

4. The method, as set forth in claim 3, further characterized by the forming of at least one end of the tubular core with a lateral circular flange extending outwardly having a surface to which the inner marginal fold-lines of said pleats will adhere, when said tube is inserted in position.

5. In the construction of a filter element, the method comprising the steps of pleating a strip of filtering sheet-material with the fold-lines of the pleats extending in the same general direction and forming said pleated sheet into a circular disc-like shape with the pleats radiating longitudinally from the axis thereof; stretching a preformed elastic band of impervious material sufficiently to encircle the outer circumference of said disc-like shape, and allowing it to contract onto and grip the outer edges of said pleated material so as to surround the outer ends of said pleats and close the spaces therebetween.

6. In the construction of a filter element, the method comprising the steps of pleating a strip of filtering sheet-material with the fold-lines of the pleats extending in the same general direction and forming said pleated sheet into a circular disc-like shape with the pleats radiating longitudinally from the axis thereof; providing an elasticized band of impervious elastomeric material and of a width wider than the thickness of said outer circumferential portion of said disc-like shape; stretching and positioning said band relative to said shape to encircle the outer circumference thereof; and allowing said band to contract onto and grip the outer edges of said pleats and close the spaces therebetween and at least one marginal edge portion of the band to overlap, under this tension, the adjacent marginal face portion of the disc-like shape to provide a gasket between the folded edges of the pleats and a cooperating part of a filter casing.

7. A filter element for filtering fluids comprising a strip of pleated filtering sheet-material formed into an annulus with the pleats spaced from each other for the greater portion of their area and radiating longitudinally from the axis of the annulus; a tubular core at the inner circumference of the annulus closing and sealing the spaces between the inner ends of said pleats; and a separate preformed snapped-on elastic outer band of impervious material surrounding the outer circumference of the annulus and held by its own tension against the outer end edges of the pleats closing and sealing the spaces between said outer ends of the pleats and maintaining the inner ends of said annular pleated material in compression upon said tubular core.

8. A filter element, as set forth in claim 7, wherein said elastic outer band is of greater width than the thickness of the outer circumference of the pleated annulus and is positioned to have at least one of its marginal edge portions projecting beyond said outer circumference of the annulus and overlapping inwardly thereof an adjacent marginal portion of the face of said annulus, under its own tension and resiliency, to provide a sealing gasket between said face of the annulus and a portion of a filter casing, when in use.

9. A filter element, as set forth in claim 7, wherein said tubular core is adapted to telescope over a cylindrical member, when said filter element is in filtering position, and a flexible resilient circular flange carried by the filter element at one end of and projecting for a distance inwardly across said central tube and dimensioned to engage with and form a seal between said cylindrical member and the tube, when the filter element is telescoped with said cylindrical member.

References Cited in the file of this patent
UNITED STATES PATENTS

| | | |
|---|---|---|
| 955,787 | Freeman | Apr. 19, 1910 |
| 1,107,485 | Bowser | Aug. 18, 1914 |
| 2,279,423 | Vokes | Apr. 14, 1942 |
| 2,593,293 | Giauque | Apr. 15, 1952 |
| 2,689,652 | Gretzinger | Sept. 21, 1954 |
| 2,731,108 | Kennedy | Jan. 17, 1956 |
| 2,732,031 | Rabbitt | Jan. 24, 1956 |
| 2,749,265 | Fricke | June 5, 1956 |
| 2,843,218 | Kiekhaefer | July 15, 1958 |

FOREIGN PATENTS

| | | |
|---|---|---|
| 1,160,074 | France | Feb. 24, 1958 |
| 809,739 | Great Britain | Mar. 4, 1959 |